(12) United States Patent
Lal et al.

(10) Patent No.: US 12,033,272 B2
(45) Date of Patent: Jul. 9, 2024

(54) DELIVERING PRE-RENDERED HOLOGRAPHIC CONTENT OVER A NETWORK

(71) Applicant: Charter Communications Operating, LLC, St. Louis, MO (US)

(72) Inventors: Dhananjay Lal, Englewood, CO (US); Andrew Ip, Centennial, CO (US); Matthew Ringenberg, Denver, CO (US); Dell Wolfensparger, Langley, WA (US); Omar Alami, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 738 days.

(21) Appl. No.: 17/158,598

(22) Filed: Jan. 26, 2021

(65) Prior Publication Data

US 2022/0113675 A1    Apr. 14, 2022

Related U.S. Application Data

(60) Provisional application No. 63/089,934, filed on Oct. 9, 2020.

(51) Int. Cl.
| | |
|---|---|
| *G06T 7/00* | (2017.01) |
| *G03H 1/00* | (2006.01) |
| *G03H 1/04* | (2006.01) |
| *G06F 3/01* | (2006.01) |
| *G06F 3/14* | (2006.01) |
| *G06T 15/20* | (2011.01) |

(52) U.S. Cl.
CPC ......... *G06T 15/205* (2013.01); *G03H 1/0005* (2013.01); *G03H 1/0402* (2013.01); *G06F 3/011* (2013.01); *G06F 3/017* (2013.01); *G06F 3/14* (2013.01); *G06T 7/97* (2017.01); *G03H 2001/0088* (2013.01); *G03H 2001/0436* (2013.01)

(58) Field of Classification Search
CPC ....... G06T 15/205; G06T 7/97; G03H 1/0005; G03H 1/265; G03H 1/268; G03H 1/0402; G03H 2001/0088; G03H 2001/0436; G06F 3/14; G06F 3/017; G06F 3/011; G06F 3/012; G06F 3/013; G06V 20/46; G06V 20/49; G06V 40/28; H04N 13/111; H04N 21/21805; H04N 21/23439; H04N 21/41415; H04N 21/6587; H04N 21/816; H04N 19/46; H04N 13/243; H04N 19/597
See application file for complete search history.

(56) References Cited

U.S. PATENT DOCUMENTS 10,981,046 B2 *   4/2021   Karafin ................. G02B 30/56
11,019,336 B2 *   5/2021   Jannard ................. H04N 19/93
(Continued)

*Primary Examiner* — Vijay Shankar
(74) *Attorney, Agent, or Firm* — Dority & Manning, P.A.

(57) ABSTRACT

Delivering pre-rendered holographic content over a network is disclosed. A first camera view segment of a plurality of camera view segments that compose a holographic video is selected. Each camera view segment corresponds to a different camera view perspective of a scene and includes rendered holographic content that depicts a plurality of concurrent different viewer perspectives of the scene. The first camera view segment is streamed toward a holographic display for presentation of the first camera view segment on the holographic display.

20 Claims, 7 Drawing Sheets

(56) References Cited

U.S. PATENT DOCUMENTS

| | | | |
|---|---|---|---|
| 11,347,185 B2* | 5/2022 | Qaderi | H04N 13/30 |
| 11,691,066 B2* | 7/2023 | Karafin | G02B 30/56 |
| | | | 463/1 |
| 11,762,333 B2* | 9/2023 | Qaderi | G02F 1/2955 |
| | | | 348/40 |
| 2021/0060405 A1* | 3/2021 | Karafin | H04N 19/20 |

* cited by examiner

DELIVERING PRE-RENDERED HOLOGRAPHIC CONTENT OVER A NETWORK

RELATED APPLICATION

This application claims the benefit of provisional patent application Ser. No. 63/089,934, filed on Oct. 9, 2020, entitled "DELIVERING PRE-RENDERED HOLOGRAPHIC CONTENT OVER A NETWORK," the disclosure of which is hereby incorporated herein by reference in its entirety.

BACKGROUND

Holographic displays are driven by holographic content that is generated in real-time, often in response to user input. Real-time generation of holographic content requires processing capabilities that many entities do not have.

SUMMARY

The embodiments disclosed herein stream holographic content to a holographic display in response to viewer inputs. In particular, a plurality of camera views of a scene are selected and pre-rendered based on light-ray data. The rendered camera views are referred to herein as camera view segments. A network computing device, such as an edge controller, selects a particular selected camera segment and streams the selected camera segment over a network to a computing device coupled to a holographic display. The network may comprise a local area network, or a combination of a local area network and a wide area network, such as a wide area network of a service provider that provides internet access to the viewer. In some embodiments, the network may comprise a high speed cellular network, such as a 5G or faster cellular network.

In one embodiment a method is provided. The method includes selecting, by one or more processor devices executing on one or more computing devices, a first camera view segment of a plurality of camera view segments that compose a holographic video, each camera view segment corresponding to a different camera view perspective of a scene and comprising rendered holographic content that depicts a plurality of concurrent different viewer perspectives of the scene. The method further includes streaming the first camera view segment toward a holographic display for presentation of the first camera view segment on the holographic display.

In another embodiment a computing system is provided. The computing system includes a network interface and at least one processor device coupled to the network interface and configured to select a first camera view segment of a plurality of camera view segments that compose a holographic video, each camera view segment corresponding to a different camera view perspective of a scene and comprising rendered holographic content that depicts a plurality of concurrent different viewer perspectives of the scene. The at least one processor device is further configured to stream the first camera view segment toward a holographic display for presentation of the first camera view segment on the holographic display.

In another embodiment a non-transitory computer-readable storage medium is provided. The non-transitory computer-readable storage medium includes executable instructions to cause a processor device to select a first camera view segment of a plurality of camera view segments that compose a holographic video, each camera view segment corresponding to a different camera view perspective of a scene and comprising rendered holographic content that depicts a plurality of concurrent different viewer perspectives of the scene. The executable instructions further cause the processor device to stream the first camera view segment toward a holographic display for presentation of the first camera view segment on the holographic display.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
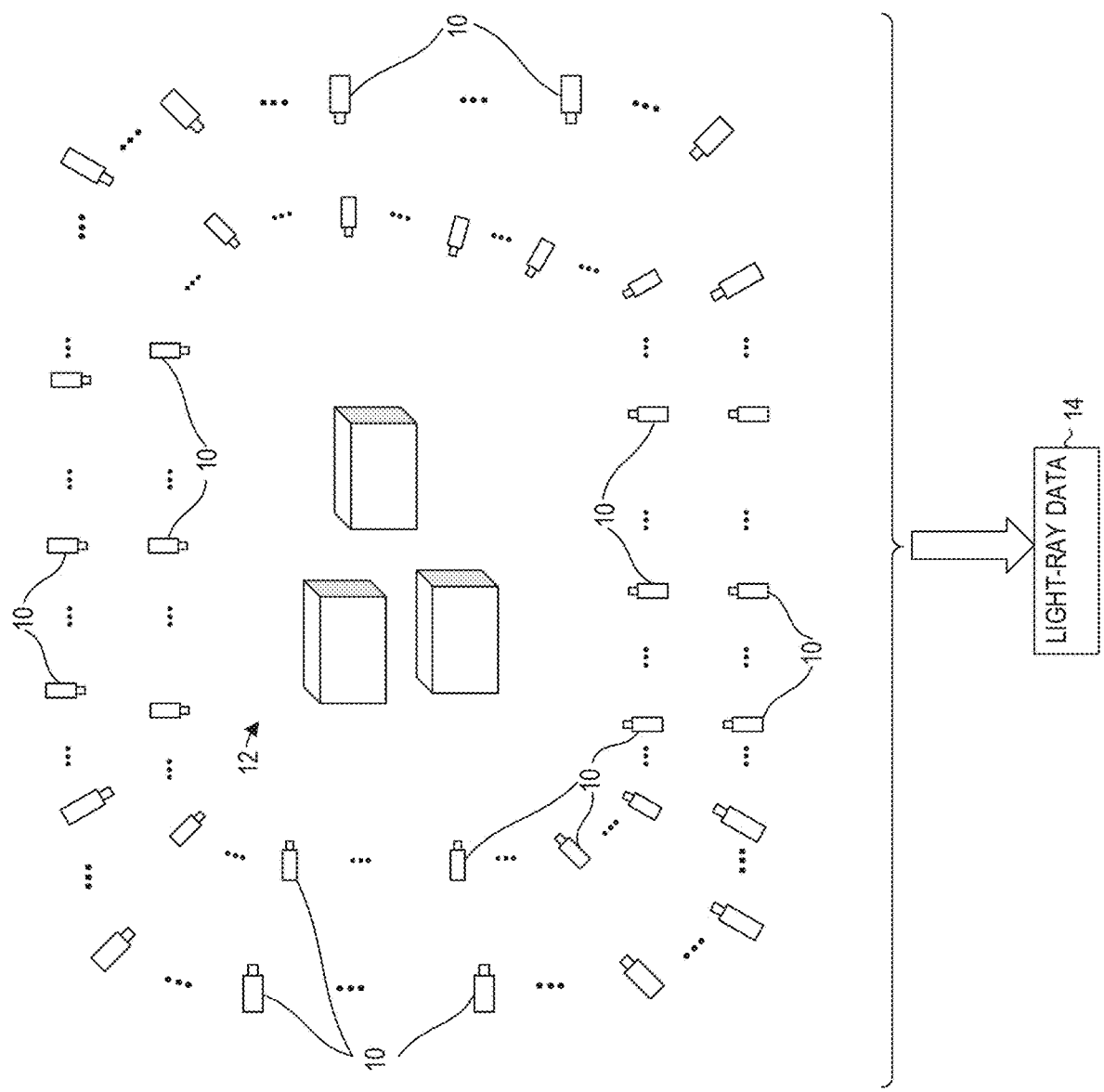
FIG. 1 is a diagram illustrating the generation of light-ray data, according to one embodiment.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The term "render" and derivations of the term "render" refer to the transformation process of generating, from light-ray data, holographic content (sometimes referred to as a hologram) that is suitable for presentation on a holographic display (sometimes referred to as a "4D display"). The precise format of the holographic content may differ depending on, for example, the requirements of a particular holographic display or compliance with a particular holographic display format. Generally, holographic content comprises an encoding of a light field as an interference pattern of variations in the opacity, density, or surface profile of the photographic medium. When suitably lit, the interference pattern diffracts the light into an accurate reproduction of the original light field, and the objects that were in it exhibit visual depth cues such as parallax and perspective that change realistically with the different angles of viewing. That is, the view of the image from different angles represents the subject viewed from similar angles. In this sense, holograms do not have just the illusion of depth but are truly three-dimensional images.

Holographic displays provide multiple viewer perspectives of a scene concurrently. Each viewer perspective is a different view of a scene, identical to how two individuals standing in proximity to one another and looking at the same object in the real-world have slightly different views of the object. One holographic display, the Looking Glass holographic display, provides 45 discrete views of a scene concurrently and projects the views over a view cone that is approximately 50 degrees wide. This arrangement of views tricks the visual perception system into seeing 3$d$ objects in two major ways, by changing a user's aspect on the scene as they move their head around the scene (parallax), and by presenting different perspectives to each eye (stereo vision).

In order to generate holographic content, a scene is captured using an array of cameras, such as an array of hundreds of cameras, recording information at terabits per second. The generated data may be referred to as light-ray data. In order to present holographic content on a holographic display, the light-ray data is rendered in real-time by graphic processing units (GPUs) and provided to the holographic display. Because a holographic display typically requires a plurality of concurrent viewer perspectives, the amount of rendered data generated by the GPUs is substantial. For example, to render 45 viewer perspectives, 1350 images per second need to be rendered for a 30 frame per second video. However, real-time rendering permits substantial viewer interactivity, such as allowing the viewer to change their relative location to the scene, such as by zooming in, zooming out, rotating the scene, viewing the scene from a side view, a top view, a bottom view, and the like. As the viewer indicates a particular view, the GPUs access the light-ray data and render (e.g. generate) the holographic content that is streamed to the holographic display. Unfortunately, many individuals do not have the equipment necessary for generating holographic content in real-time and thus cannot enjoy holographic content.

The embodiments disclosed herein stream pre-rendered holographic content to a holographic display. In particular, a plurality of camera views of the scene are selected and pre-rendered, and in some implementations encoded, based on light-ray data of a scene. The rendered camera views are referred to herein as camera view segments. A network computing device, such as an edge controller in a network, selects a particular camera view segment and streams the selected camera segment over the network to a computing device coupled to a holographic display. The network may comprise a local area network, or a combination of a local area network and a wide area network, such as a wide area network of a service provider that provides internet access to the viewer. In some embodiments, the network may comprise a high-speed cellular network, such as a 5G or faster cellular network.

The holographic display computing device receives the camera view segment, and presents the camera view segment on the holographic display. A viewer may provide an input, such as via a gesture, a keyboard, a mouse, or the like, which the holographic display computing device receives and provides to the network computing device via the network. Based on the input, the network computing device may select a different camera view segment from the plurality of pre-rendered camera view segments, seek to the correct time within the camera view segment, and send the camera view segment over the network to the holographic display computing device for presentation on the holographic display.

FIG. 1 is a diagram illustrating the generation of light-ray data according to one embodiment. An array of cameras 10 (only some labelled with element reference numerals) records a scene 12 from many different actual camera view perspectives. The cameras 10 may comprise hundreds of cameras. The data generated by the cameras 10 is stored as light-ray data 14. The light-ray data 14 may comprise terabytes of data. In this embodiment, the light-ray data may be referred to as lightfield data. It is noted that FIG. 1 illustrates only one way to generate light-ray data, and the embodiments are applicable to any type of light-ray data, such as synthetic (e.g., computer-generated) light-ray data or the like, from which holographic content can be pre-rendered, irrespective of the format or content of the light-ray data. Note that FIG. 1 shows the scene 12 at an instant in time, and that the content of the scene 12 may change over time.

Figure 2:
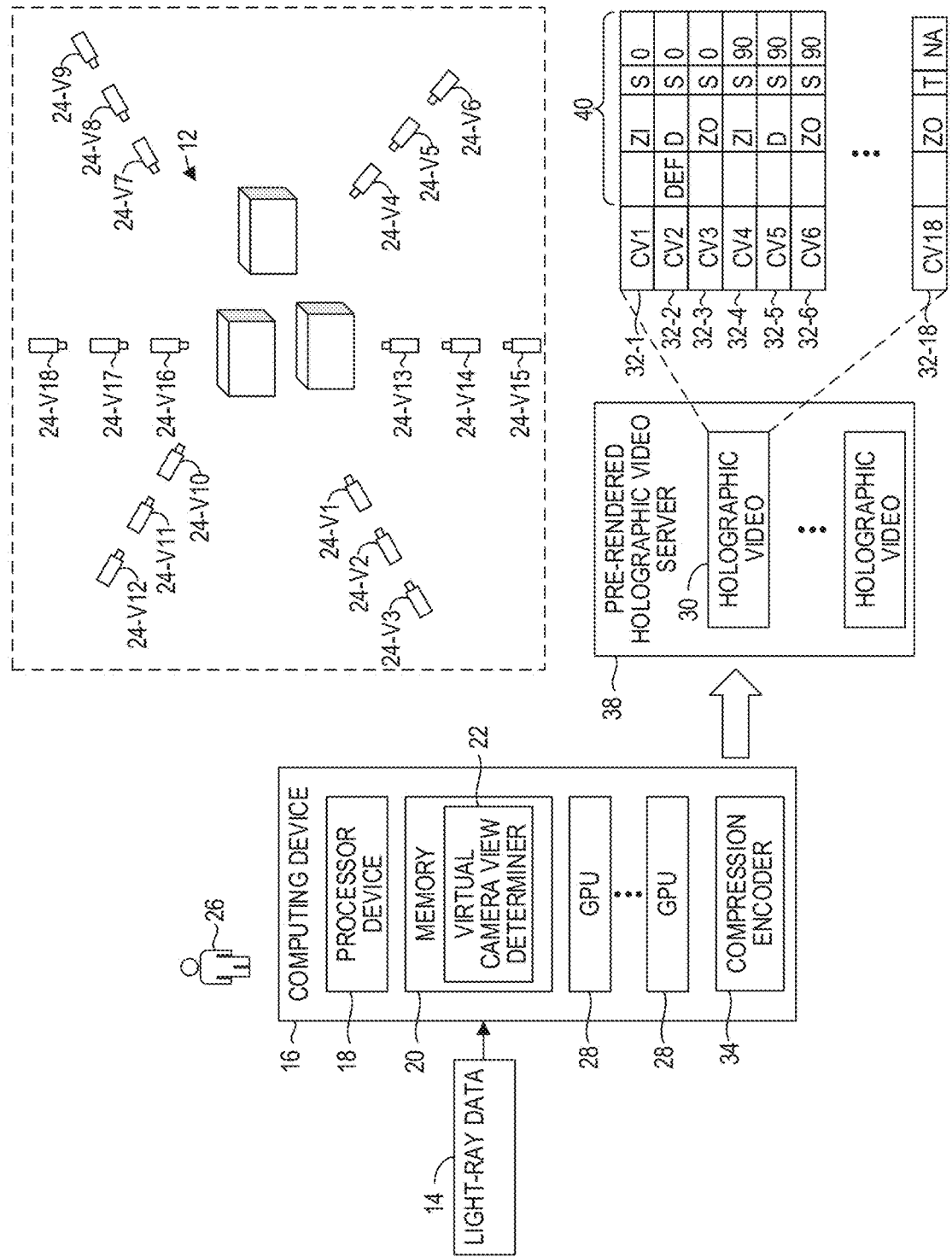
FIG. 2 is a block diagram of a system for generating a plurality of different camera view segments from the light-ray data, according to one embodiment.

FIG. 2 is a block diagram of a system for generating a plurality of different camera view segments from the light-ray data 14, according to one embodiment. A computing device 16 includes a processor device 18 and a memory 20. The memory 20 includes a virtual camera view determiner 22 that determines a plurality of virtual camera view perspectives 24-V1-24-V18 of the scene 12. The virtual camera view determiner 22 may determine the plurality of virtual camera view perspectives 24-V1-24-V18 automatically, or in response to input from an operator 26. The virtual camera view determiner 22 may determine any number of virtual camera view perspectives, such as tens or hundreds of different camera view perspectives.

In this example, the virtual camera view determiner 22 has determined 18 different virtual camera view perspectives 24-V1-24-V18. The virtual camera view perspectives 24-V1-24-V12 are side virtual camera view perspectives that are oriented on the same plane. The virtual camera view perspectives 24-V1-24-V3 are oriented 90 degrees from the virtual camera view perspectives 24-V4-24-V6, which in turn are 90 degrees from the virtual camera view perspectives 24-V7-24-V9, which in turn are 90 degrees from the virtual camera view perspectives 24-V10-24-V12. The three virtual camera view perspectives 24-V1-24-V3 include a zoomed-in virtual camera view perspective 24-V1, a default virtual camera view perspective 24-V2, and a zoomed-out virtual camera view perspective 24-V3. Each of the groups of three virtual camera view perspectives 24-V4-24-V6, 24-V7-24-V9, and 24-V10-24-V12 similarly comprise a zoomed-in virtual camera view perspective, a default virtual camera view perspective, and a zoomed-out virtual camera view perspective. The virtual camera view perspectives 24-V13-24-V15 are zoomed-in, default, and zoomed-out bottom virtual camera view perspectives, respectively. The virtual camera view perspectives 24-V16-24-V18 are zoomed-in, default, and zoomed-out top virtual camera view perspectives, respectively.

One or more graphic processing units (GPUs) 28 then process the light-ray data 14 and, based on the eighteen virtual camera view perspectives 24, render a holographic video 30 that is made up of eighteen different camera view segments 32-1-32-18 (generally, camera view segments 32), each camera view segment 32 corresponding to a different one of the eighteen virtual camera view perspectives 24. Each camera view segment 32 contains holographic content comprising multiple different viewer perspectives in accordance with the requirements of the holographic displays on which the holographic video 30 will be presented. As an example, as discussed above, each camera view segment 32 may comprise holographic content that comprises, for each frame of the scene 12, 45 different viewer perspectives within a particular field of view based on the camera angle, such as a 50 degree field of view. In some embodiments, the holographic video 30 may be processed by a compression encoder 34 to compress the holographic video 30, prior to storing the holographic video 30 on a pre-rendered holographic video server 38. In some implementations, the camera view segments 32-1-32-18 may include associated metadata 40 that comprises information about each respective camera view segment 32. In this example, the metadata 40 provides information regarding whether each particular camera view segment 32 is a side view (e.g., "S"), a top view (e.g., "T"), or a bottom view (e.g., "B", not illustrated). The metadata 40 also provides information regarding the zoomed-in, default, and zoomed-out relationships of the camera view segments 32-1-32-18 via the letters ZI, D, and ZO, as well as the relative orientation of the side camera view perspectives of the camera view segments 32-1-32-18, via the numbers 0, 90, 180, and 270. In this example, the camera view segment 32-V2 has been designated as a default camera view segment ("DEF") to be initially presented to a viewer.

Figure 3:
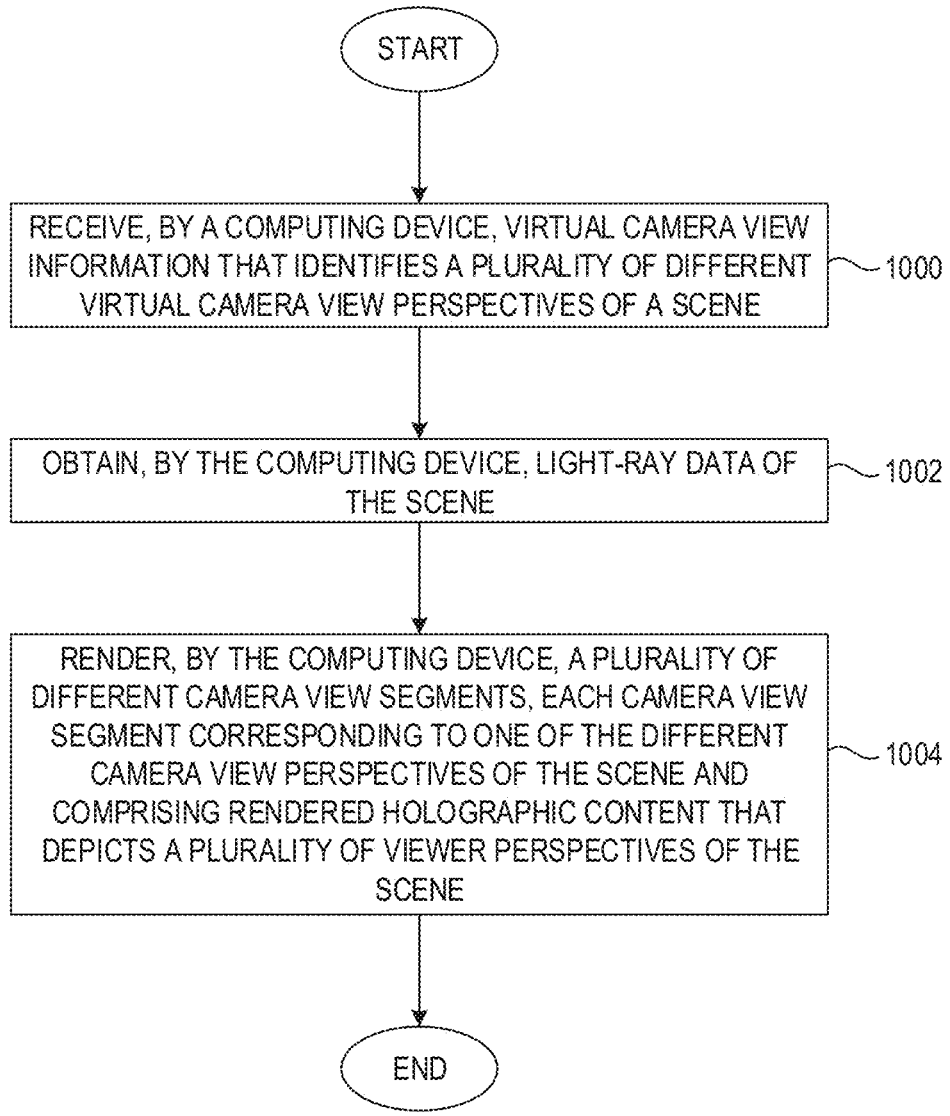
FIG. 3 is a flowchart of a method for generating a plurality of camera view segments, according to one embodiment.

FIG. 3 is a flowchart of a method for generating a plurality of camera view segments, according to one embodiment. FIG. 3 will be discussed in conjunction with FIG. 2. The computing device 16 receives camera view information that identifies the plurality of different virtual camera view perspectives 24-V1-24-V18 of the scene 12 from the operator 26 (FIG. 3, block 1000). The computing device 16 obtains the light-ray data 14 of the scene 12 (FIG. 3, block 1002). The computing device 16 renders the plurality of different camera view segments 32-1-32-18, each camera view segment 32-1-32-18 corresponding to one of the different virtual camera view perspectives 24-V1-24-V18 of the scene 12 and comprising rendered holographic content that depicts a plurality of concurrent different viewer perspectives of the scene 12 (FIG. 3, block 1004).

Figure 4:
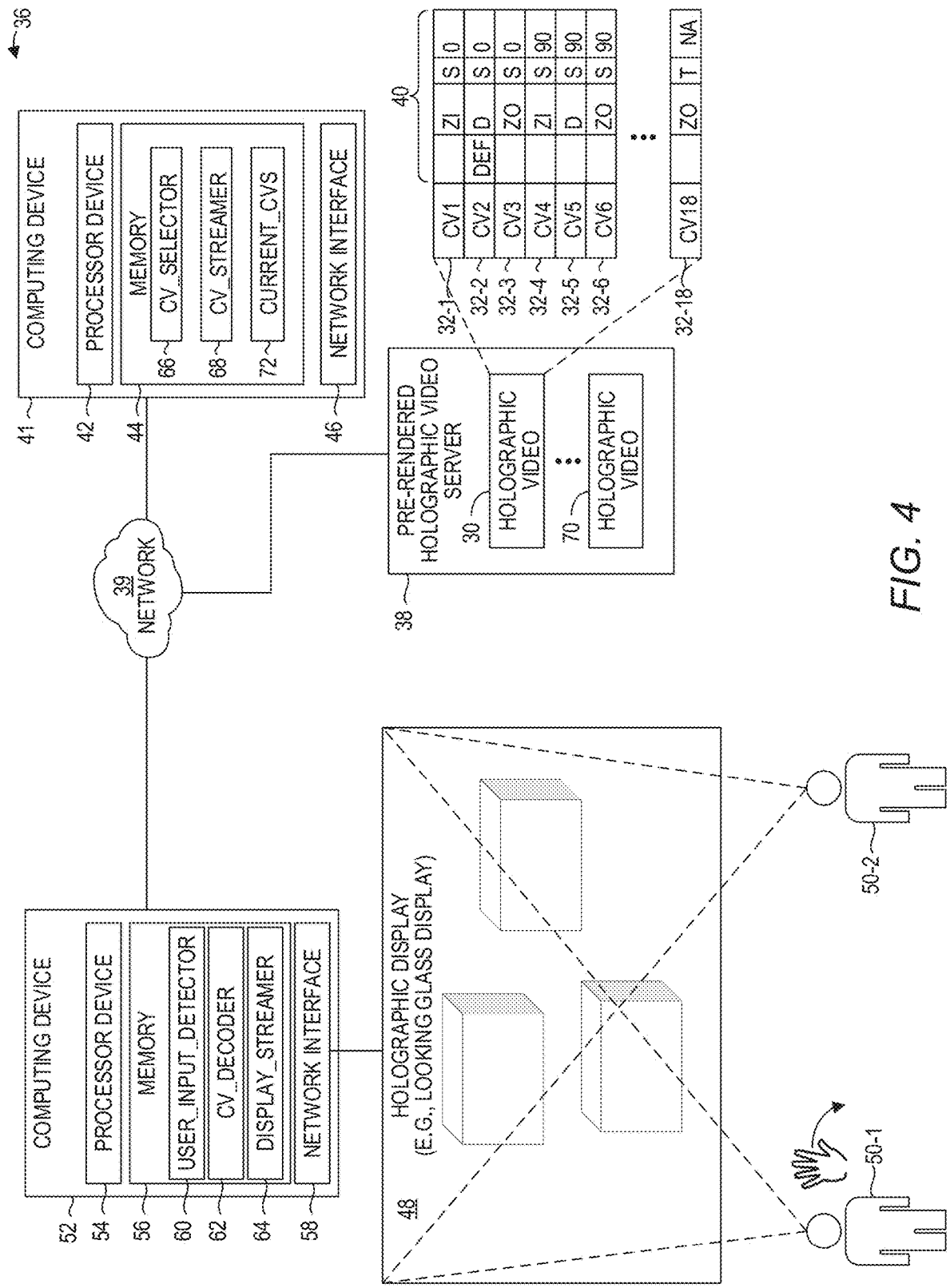
FIG. 4 is a block diagram of an environment suitable for delivering pre-rendered holographic content over a network according to one embodiment.

FIG. 4 is a block diagram of an environment 36 suitable for delivering pre-rendered holographic content over a network 39 according to one embodiment. The environment 36 includes a computing device 41, which in turn includes a processor device 42, a memory 44, and a network interface 46, such as a coaxial cable transceiver, Ethernet transceiver, or the like. The environment 36 also includes a holographic display 48 that is configured to present holograms to one or more viewers 50-1, 50-2. The holographic display 48 may comprise any suitable holographic display that is capable of presenting multiple viewer perspectives concurrently to the viewers 50-1, 50-2, such that each viewer 50 may have a different viewer perspective and see a slightly different view of the scene 12 presented on the holographic display 48.

The holographic display 48 includes, or is communicatively coupled to, a computing device 52 which includes a processor device 54, a memory 56, and a network interface 58. The computing device 52 serves as a controller for the holographic display 48. The memory 56 includes a user input detector 60 that is configured to detect user input from a viewer 50, such as a gesture, or the like. The memory 56 also includes a camera view segment decoder 62 that is configured to decode encoded holographic content received from the computing device 41, and a display streamer 64 that provides decoded holographic content to the holographic display 48.

The memory 44 of the computing device 41 includes a camera view selector 66, which selects a particular camera view segment to provide the computing device 52 for presentation on the holographic display 48, and a camera view segment streamer 68 for providing the holographic content to the computing device 52.

The computing device 41 includes, or is communicatively coupled to, the pre-rendered holographic video server 38 that contains one or more holographic videos 30, 70. The computing device 41 and the computing device 52 communicate with one another via the network 39. In one embodiment, the network 39 may comprise a local area network (LAN) to which both the computing device 41 and the computing device 52 are directly coupled. In other embodiments, the network 39 may comprise multiple networks, such as both a LAN, to which the computing device 52 is directly coupled, and a service provider network communicatively coupled to the LAN and to the computing device 41.

As an example of delivering pre-rendered holographic content (e.g., a hologram) over the network 39, assume that the viewer 50-1 makes an initial request to view the holographic video 30. The computing device 52 sends the request to the computing device 41 via the network 39. The camera view selector 66 selects the camera view segment 32-2, which, in this example, has the associated metadata 40 that identifies the camera view segment 32-2 as an initial default camera view segment 32 to provide a viewer. The camera view segment streamer 68 begins streaming the camera view segment 32-2 to the computing device 52 by starting a continuous process of reading the encoded holographic content from the camera view segment 32-2 and sending the encoded holographic content via the network 39 to the computing device 52. In some embodiments the pre-rendered holographic content may not be pre-encoded, and the camera view segment streamer 68 may utilize, in real-time, a compression encoder to encode the pre-rendered holographic content prior to streaming the holographic content to the computing device 52. Note that the holographic content, due to the number of concurrent viewer perspectives and other attributes, may require substantial bandwidth, such as, by way of non-limiting example, 400 Mbps-800 Mbps or greater.

The computing device 52 receives the encoded holographic content via the network 39. The camera view segment decoder 62 decodes the encoded holographic content, and the display streamer 64 presents the decoded holographic content on the holographic display 48. The decoded holographic content may comprise a plurality of frames, each frame comprising rendered holographic content that depicts the plurality of concurrent different viewer perspectives of the scene 12. The frames may be presented at a particular rate, such as 30, 60 or 120 frames per second. Each of the viewers 50-1, 50-2 perceive the hologram presented on the holographic display 48 slightly differently because of the distance between the viewers 50-1, 50-2, and thus corresponding slightly different perspectives of the viewers 50-1, 50-2.

In some embodiments, the user input detector 60 may identify user input. The user input may be generated in any number of ways. For example, the user input detector 60 may include one or more cameras that capture the viewers 50-1, 50-2 and recognize pre-determined gestures of the viewers as input commands. In other embodiments, the viewers 50-1, 50-2 may wear or carry apparatus that provide wireless signals (e.g., Bluetooth®, Wi-Fi®, or the like) to the user input detector 60, either via movement of the apparatus or via a keypad, user interface, or the like.

Assume that after the camera view segment 32-2 has begun being presented on the holographic display 48, the user input detector 60 detects a gesture of the viewer 50-1 as a user input. The computing device 52 generates user input data that identifies the user input, and sends the user input data to the computing device 41. In this example, assume that the user input data indicates that the viewer 50-1 has requested a top view of the scene 12. The camera view selector 66 determines, based on the metadata 40, that a camera view segment 32 that corresponds to the virtual camera view perspective 24-V17 provides a default top view of the scene 12. The camera view segment streamer 68 determines a current time offset from a beginning of the holographic video 30 that is currently being presented to the viewers 50-1, 50-2. The camera view segment streamer 68 moves (i.e., seeks) to the corresponding location in the camera view segment 32, and begins streaming the camera view segment 32 that corresponds to the virtual camera view perspective 24-V17 from such location to the computing device 52 by starting a continuous process of reading the holographic content from such camera view segment 32 and sending the encoded holographic content via the network 39 to the computing device 52.

The computing device 52 receives the encoded holographic content via the network 39. The camera view segment decoder 62 decodes the encoded holographic content, and the display streamer 64 presents the decoded holographic content on the holographic display 48.

Note that no processing time is incurred to render any holographic content because the holographic content has been pre-rendered, at the expense of a finite number of camera view perspectives for the viewers 50-1, 50-2, in contrast to an infinite number of viewer perspectives in a typical real-time rendering environment.

It is noted that the camera view segments 32 can correspond to any number of different camera views, such as zoom-in camera views from many different perspectives, zoom-out camera views, incremental rotational views around the scene 12, exploded views of the scene 12 or specific objects in the scene 12, and the like. In some embodiments, the user inputs are contextual in that a rotational gesture will cause the scene 12 to rotate a predetermined amount with respect to the current camera view being viewed on the holographic display 48.

For example, assume that after the camera view segment 32-2 has begun being presented on the holographic display 48, the user input detector 60 detects a gesture of the viewer 50-1 as a user input. The computing device 52 generates user input data that identifies the user input, and sends the user input data to the computing device 41. In this example, assume that the user input data indicates that the viewer 50-1 made a zoom-in request. The camera view selector 66 accesses a current camera view segment 72, which identifies the camera view segment 32-2 as being the current camera view segment 32 that is being streamed toward the holographic display 48. The camera view selector 66 determines, based on the metadata 40 associated with the camera view segment 32-2, and the metadata 40 associated with the camera view segment 32-1, that the camera view segment 32-1 comprises a zoom-in view of the scene 12 along a same line of view of the current camera view segment 32-2. The camera view segment streamer 68 determines a current time offset from a beginning of the holographic video 30 that is currently being presented to the viewers 50-1, 50-2. The camera view segment streamer 68 moves (i.e., seeks) to the corresponding location in the camera view segment 32-1, and begins streaming the camera view segment 32-1 from such location to the computing device 52 by starting a continuous process of reading the holographic content from the camera view segment 32-1 and sending the encoded holographic content via the network 39 to the computing device 52.

As another example, assume that after the camera view segment 32-2 has begun being presented on the holographic display 48, the user input detector 60 detects a gesture of the viewer 50-1 as a user input. The computing device 52 generates user input data that identifies the user input, and sends the user input data to the computing device 41. In this example, assume that the user input data indicates that the viewer 50-1 made a clockwise rotation request. The camera view selector 66 accesses the current camera view segment 72, which identifies that camera view segment 32-2 as being the current camera view segment 32 that is being streamed toward the holographic display 48. The camera view selector 66 determines, based on the metadata 40 associated with the camera view segment 32-2, and the metadata 40 associated with the camera view segment 32 that corresponds to the virtual camera view perspective 24-V5, that such camera view segment 32 is a different view of the scene 12 from a direction (clockwise rotation of the scene 12) consistent with the clockwise rotation request. The camera view segment streamer 68 determines a current time offset from a beginning of the holographic video 30 that is currently being presented to the viewers 50-1, 50-2. The camera view segment streamer 68 moves (i.e., seeks) to the corresponding location in the camera view segment 32 that corresponds to the virtual camera view perspective 24-V5, and begins streaming such camera view segment 32 from such location to the computing device 52 by starting a continuous process of reading the holographic content from such camera view segment 32 and sending the encoded holographic content via the network 39 to the computing device 52.

Figure 5:
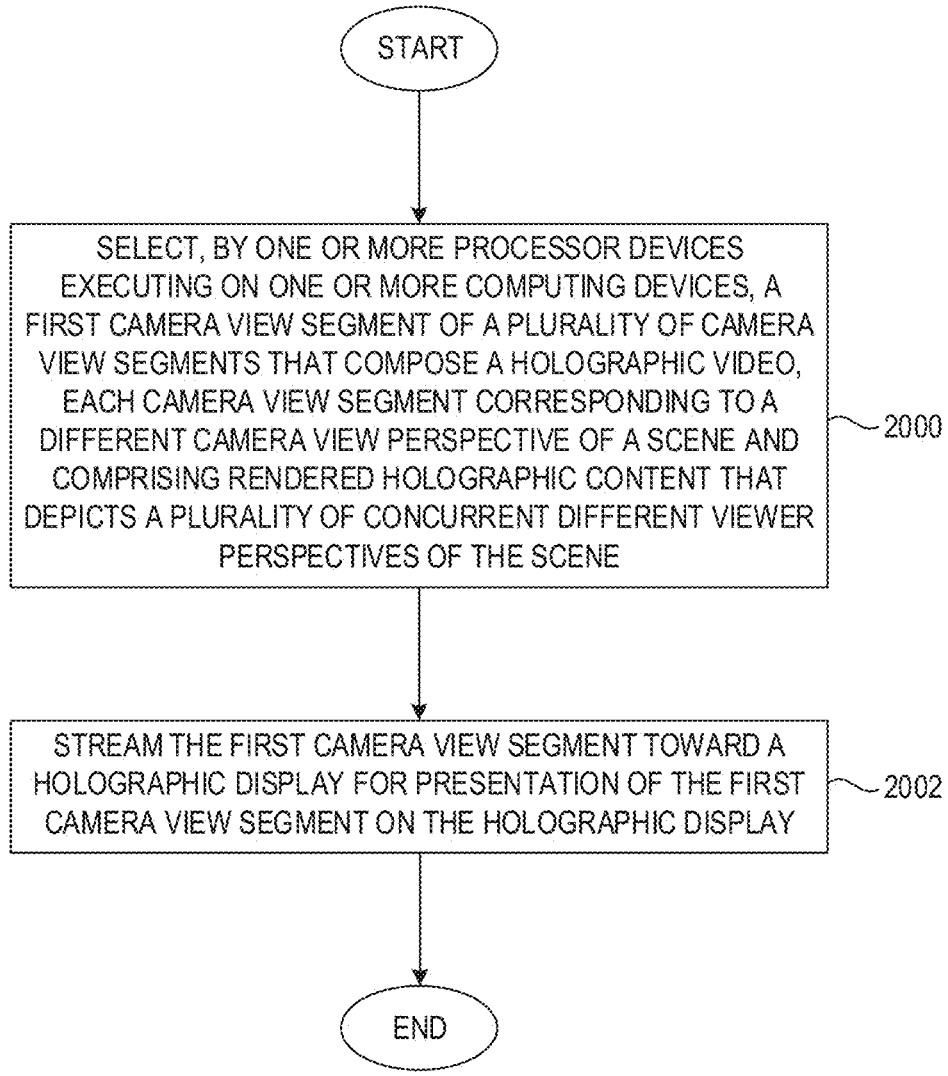
FIG. 5 is a flowchart of a method of delivering pre-rendered holographic content over a network according to one embodiment.

FIG. 5 is flowchart of a method of delivering pre-rendered holographic content over a network according to one embodiment. FIG. 5 will be discussed in conjunction with FIG. 4. The computing device 41 selects the camera view segment 32-2 of the plurality of camera view segments 32-1-32-18 that compose the holographic video 30, each camera view segment 32 corresponding to a different virtual camera view perspective of the scene 12 and comprising rendered holographic content that depicts a plurality of concurrent different viewer perspectives of the scene 12 (FIG. 5, block 2000). The computing device 41 streams the camera view segment 32-2 toward the holographic display 48 for presentation of the camera view segment 32-2 on the holographic display 48 (FIG. 5, block 2002). The term "toward" in this context means that the camera view segment 32-2 is ultimately destined for the holographic display 48, although the camera view segment 32-2 may first traverse or otherwise be processed by one or more intermediate devices, such as the computing device 52 and one or more intermediate devices between the computing device 41 and the computing device 52.

Although, solely for purposes of illustration, the computing device 52 is shown as having multiple functions, it will be apparent that the functionality attributed to the computing device 52 can be divided and distributed as suitable over multiple different computing devices. Similarly, although solely for purposes of illustration, the computing device 41 is shown as having multiple functions, it will be apparent that the functionality attributed to the computing device 41 can be divided and distributed as suitable over multiple different computing devices. Moreover, because the camera view selector 66 and the camera view segment streamer 68 are components of the computing device 41, functionality implemented by the camera view selector 66 and the camera view segment streamer 68 may be attributed to the computing device 41 generally. Moreover, in examples where the camera view selector 66 and the camera view segment streamer 68 comprise software instructions that program the processor device 42 to carry out functionality discussed herein, functionality implemented by the camera view selector 66 and the camera view segment streamer 68 may be attributed herein to the processor device 42.

Figure 6:
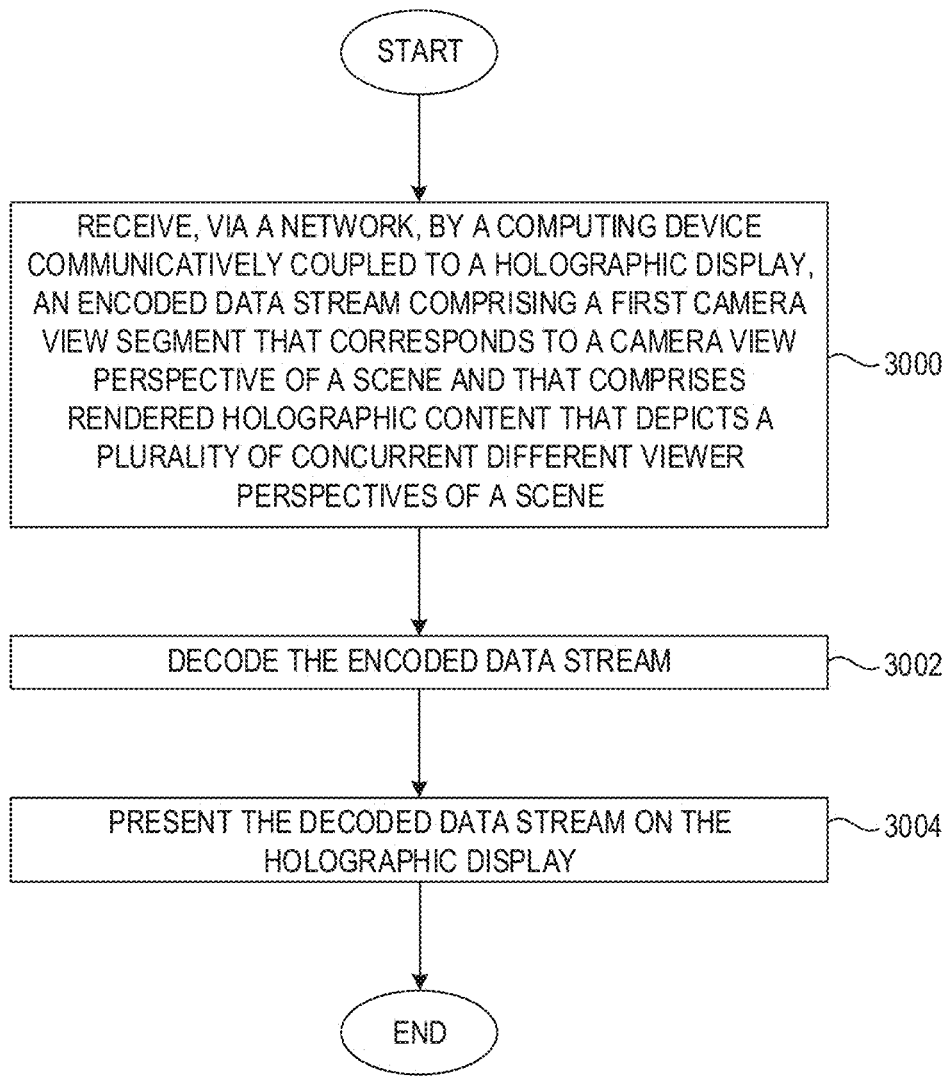
FIG. 6 is a flowchart of a method for presenting pre-rendered holographic content on a holographic display, according to one embodiment.

FIG. 6 is a method for presenting pre-rendered holographic content on a holographic display, according to one embodiment. FIG. 6 will be discussed in conjunction with FIG. 4. The computing device 52, which is communicatively coupled to the holographic display 48, receives, via the network 39, an encoded data stream comprising the camera view segment 32-1 that corresponds to the virtual camera view perspective 24-V2 of the scene 12 and that comprises rendered holographic content that depicts a plurality of concurrent different viewer perspectives of the scene 12 (FIG. 6, block 3000). The computing device 52 decodes the encoded data stream (FIG. 6, block 3004). The computing device 52 presents the decoded data stream on the holographic display 48 (FIG. 6, block 3004).

Figure 7:
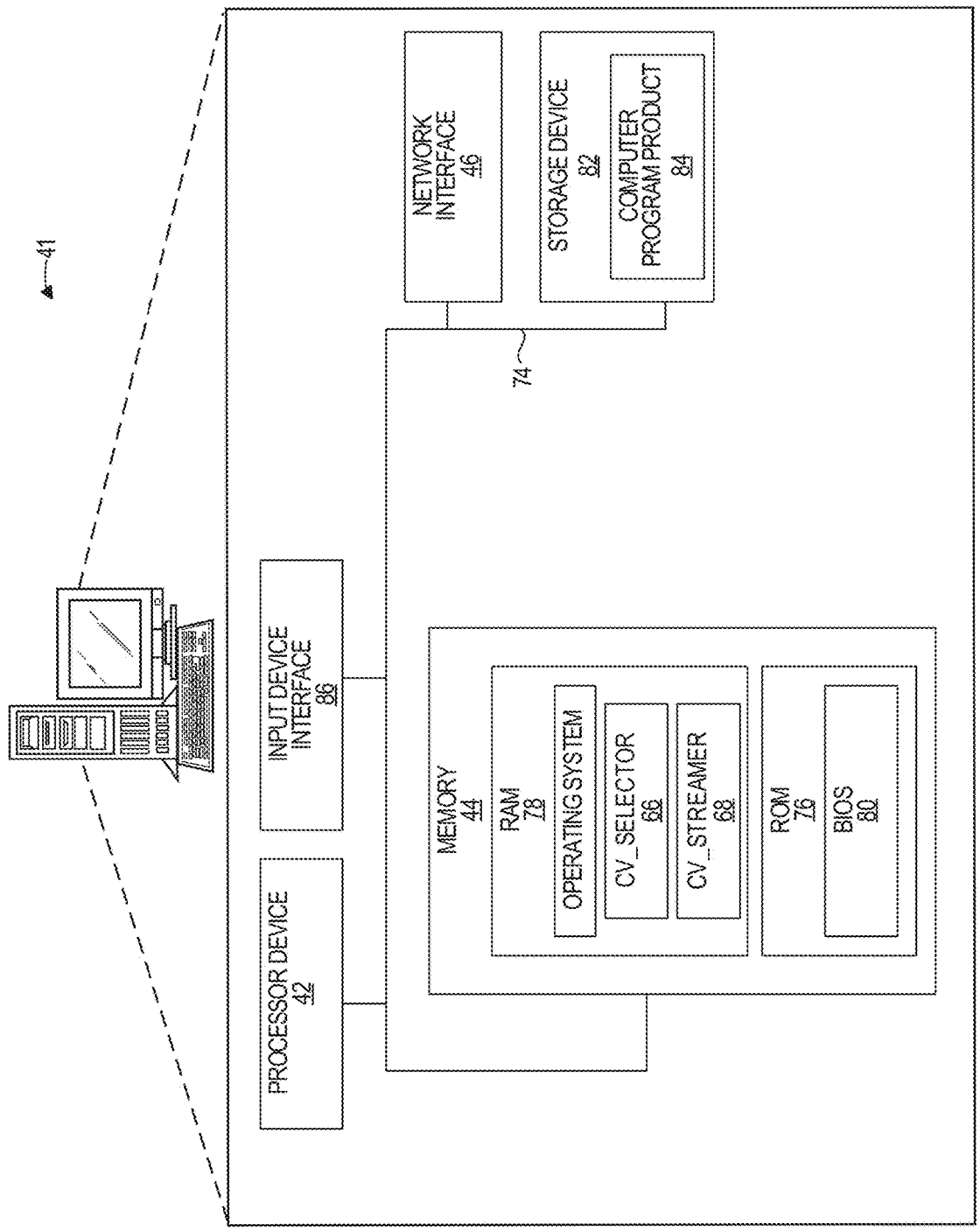
FIG. 7 is a block diagram of a computing device suitable for implementing embodiments disclosed herein.

FIG. 7 is a block diagram of the computing device 41 suitable for implementing examples according to one example. The computing device 41 may comprise any computing or electronic device capable of including firmware, hardware, and/or executing software instructions to implement the functionality described herein, such as a computer server, a desktop computing device, a laptop computing device, or the like. The computing device 41 includes the processor device 42, the memory 44, and a system bus 74. The system bus 74 provides an interface for system components including, but not limited to, the memory 44 and the processor device 42. The processor device 42 can be any commercially available or proprietary processor.

The system bus 74 may be any of several types of bus structures that may further interconnect to a memory bus (with or without a memory controller), a peripheral bus, and/or a local bus using any of a variety of commercially available bus architectures. The memory 44 may include non-volatile memory 76 (e.g., read-only memory (ROM), erasable programmable read-only memory (EPROM), electrically erasable programmable read-only memory (EEPROM), etc.), and volatile memory 78 (e.g., random-access memory (RAM)). A basic input/output system (BIOS) 80 may be stored in the non-volatile memory 76 and can include the basic routines that help to transfer information between elements within the computing device 41. The volatile memory 78 may also include a high-speed RAM, such as static RAM, for caching data.

The computing device 41 may further include or be coupled to a non-transitory computer-readable storage medium such as a storage device 82, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 82 and other drives associated with computer-readable media and computer-usable media may provide non-volatile storage of data, data structures, computer-executable instructions, and the like.

A number of modules can be stored in the storage device 82 and in the volatile memory 78, including an operating system and one or more program modules, such as the camera view selector 66 and the camera view segment streamer 68, which may implement the functionality described herein in whole or in part.

All or a portion of the examples may be implemented as a computer program product 84 stored on a transitory or non-transitory computer-usable or computer-readable storage medium, such as the storage device 82, which includes complex programming instructions, such as complex computer-readable program code, to cause the processor device 42 to carry out the steps described herein. Thus, the computer-readable program code can comprise software instructions for implementing the functionality of the examples described herein when executed on the processor device 42. The processor device 42, in conjunction with the camera view selector 66 and the camera view segment streamer 68 in the volatile memory 78, may serve as a controller, or control system, for the computing device 41 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 42 through an input device interface 86 that is coupled to the system bus 74 but can be connected by other interfaces such as a parallel port, an Institute of Electrical and Electronic Engineers (IEEE) 1394 serial port, a Universal Serial Bus (USB) port, an IR interface, and the like. The computing device 41 may also include the network interface 46 suitable for communicating with the network 39 appropriate or desired.

Those skilled in the art will recognize improvements and modifications to the preferred embodiments of the disclosure. All such improvements and modifications are considered within the scope of the concepts disclosed herein and the claims that follow.

What is claimed is:

1. A non-transitory computer-readable storage medium that includes executable instructions to cause a processor device to:
   select a first camera view segment of a plurality of camera view segments that compose a holographic video, each camera view segment corresponding to a different camera view perspective of a scene and comprising rendered holographic content that depicts a plurality of concurrent different viewer perspectives of the scene;
   stream the first camera view segment toward a holographic display for presentation of the first camera view segment on the holographic display;

select, based on user input made at a current time offset of the first camera view segment, a second camera view segment; and stream, starting at a location of the second camera view segment that corresponds to the current time offset of the first camera view segment, the second camera view segment toward the holographic display for presentation of the second camera view segment on the holographic display.

2. The non-transitory computer-readable storage medium of claim 1 wherein the first camera view segment comprises a plurality of frames, each frame comprising the rendered holographic content that depicts the plurality of concurrent different viewer perspectives of the scene.

3. The non-transitory computer-readable storage medium of claim 1 wherein to stream the first camera view segment toward the holographic display for presentation of the first camera view segment on the holographic display, the instructions further cause the processor device to stream the first camera view segment over a network toward the holographic display for presentation of the first camera view segment on the holographic display.

4. A computing system comprising:
a network interface; and
at least one processor device coupled to the network interface and configured to:
select a first camera view segment of a plurality of camera view segments that compose a holographic video, each camera view segment corresponding to a different camera view perspective of a scene and comprising rendered holographic content that depicts a plurality of concurrent different viewer perspectives of the scene, each camera view segment comprising rendered holographic content that is concurrent in time with the rendered holographic content in each other camera view segment of the plurality of camera view segments; and
stream the first camera view segment toward a holographic display for presentation of the first camera view segment on the holographic display.

5. The computing system of claim 4 wherein the first camera view segment comprises a plurality of frames, each frame comprising the rendered holographic content that depicts the plurality of concurrent different viewer perspectives of the scene.

6. The computing system of claim 4 wherein to stream the first camera view segment toward the holographic display for presentation of the first camera view segment on the holographic display, the at least one processor device is further configured to stream the first camera view segment over a network toward the holographic display for presentation of the first camera view segment on the holographic display.

7. The computing system of claim 4 wherein the at least one processor device is further configured to:
receive user input data that identifies a user input;
select, based on the user input data, a second camera view segment;
determine a current time offset from a beginning of the holographic video at which a current camera view segment is currently being presented on the holographic display;
seek to a location of the second camera view segment that corresponds to the current time offset; and
stream, starting at the location, the second camera view segment toward the holographic display for presentation of the second camera view segment on the holographic display.

8. A method comprising:
selecting, by one or more processor devices executing on one or more computing devices, a first camera view segment of a plurality of camera view segments that compose a holographic video, each camera view segment corresponding to a different camera view perspective of a scene and comprising rendered holographic content that depicts a plurality of concurrent different viewer perspectives of the scene, each camera view segment comprising rendered holographic content that is concurrent in time with the rendered holographic content in each other camera view segment of the plurality of camera view segments; and
streaming the first camera view segment toward a holographic display for presentation of the first camera view segment on the holographic display.

9. The method of claim 8 further comprising:
receiving, by the one or more processor devices executing on the one or more computing devices, camera view perspective information that identifies a plurality of different camera view perspectives of the scene;
based on the camera view perspective information, accessing light-ray data of the scene; and
generating, for each different camera view perspective of the plurality of different camera view perspectives, a corresponding camera view segment comprising the rendered holographic content that depicts the plurality of concurrent different viewer perspectives of the scene.

10. The method of claim 8 further comprising compressing each of the plurality of camera view segments via a compression encoder.

11. The method of claim 8 wherein selecting the first camera view segment comprises determining, by the one or more processor devices, that the first camera view segment has been designated to be a default camera view segment.

12. The method of claim 8 wherein the first camera view segment comprises a plurality of frames, each frame comprising the rendered holographic content that depicts the plurality of concurrent different viewer perspectives of the scene.

13. The method of claim 8 further comprising:
encoding, by the one or more processor devices executing on the one or more computing devices, the first camera view segment prior to streaming the first camera view segment over a network toward the holographic display.

14. The method of claim 8 wherein streaming the first camera view segment toward the holographic display for presentation of the first camera view segment on the holographic display further comprises streaming the first camera view segment over a network toward the holographic display for presentation of the first camera view segment on the holographic display.

15. The method of claim 8 further comprising:
receiving, by the one or more processor devices, user input data that identifies a user input;
selecting, based on the user input data, a second camera view segment; and
streaming the second camera view segment toward the holographic display for presentation of the second camera view segment on the holographic display.

16. The method of claim 15 wherein the user input data comprises at least one of a zoom-in request, a zoom-out request, a particular view request, a forward request, or a rewind request.

17. The method of claim 15 further comprising:
determining, by the one or more processors, that the user input data comprises a zoom-in request;
determining, by the one or more processors, a current camera view segment being streamed toward the holographic display;
determining, based on the current camera view segment being streamed toward the holographic display, that the second camera view segment comprises a zoom-in view of the scene along a same line of view of the current camera view segment; and
streaming the second camera view segment toward the holographic display for presentation of the second camera view segment on the holographic display.

18. The method of claim 15 further comprising:
determining, by the one or more processors, that the user input data comprises a rotation request;
determining, by the one or more processors, a current camera view segment being streamed toward the holographic display;
determining, based on the current camera view segment being streamed toward the holographic display, that the second camera view segment comprises a different view of the scene from a direction consistent with the rotation request; and
streaming the second camera view segment toward the holographic display for presentation of the second camera view segment on the holographic display.

19. The method of claim 8 further comprising:
receiving, by the one or more processor devices, user input data that identifies a user input;
selecting, based on the user input data, a second camera view segment;
determining a current time offset from a beginning of the holographic video at which a current camera view segment is currently being presented on the holographic display;
seeking to a location of the second camera view segment that corresponds to the current time offset; and
streaming, starting at the location, the second camera view segment toward the holographic display for presentation of the second camera view segment on the holographic display.

20. The method of claim 8 wherein the first camera view segment comprises ten or more concurrent different viewer perspectives, each viewer perspective corresponding to a different view of the scene.

* * * * *